US008181261B2

(12) United States Patent
Sperry

(10) Patent No.: US 8,181,261 B2
(45) Date of Patent: May 15, 2012

(54) SYSTEM AND METHOD FOR CONTROLLING REPRODUCTION OF DOCUMENTS CONTAINING SENSITIVE INFORMATION

(75) Inventor: Robert H. Sperry, Pittsford, NY (US)

(73) Assignee: Xerox Corporation, Norwalk, CT (US)

(*) Notice: Subject to any disclaimer, the term of this patent is extended or adjusted under 35 U.S.C. 154(b) by 1825 days.

(21) Appl. No.: 11/129,156

(22) Filed: May 13, 2005

(65) Prior Publication Data

US 2006/0259983 A1    Nov. 16, 2006

(51) Int. Cl.
G06F 21/00    (2006.01)

(52) U.S. Cl. ............. 726/28; 726/27; 726/32; 713/176; 713/179; 380/243; 399/366

(58) Field of Classification Search .............. 726/27, 726/28, 32; 713/176, 179; 380/243; 399/366
See application file for complete search history.

(56) References Cited

U.S. PATENT DOCUMENTS

| | | | | |
|---|---|---|---|---|
| 4,728,984 A | | 3/1988 | Daniele | 355/6 |
| 5,157,726 A | * | 10/1992 | Merkle et al. | 713/176 |
| 5,444,779 A | | 8/1995 | Daniele | 380/3 |
| 5,449,895 A | | 9/1995 | Hecht et al. | 235/494 |
| 5,449,896 A | | 9/1995 | Hecht et al. | 235/494 |
| 5,453,605 A | | 9/1995 | Hecht et al. | 235/494 |
| 5,504,818 A | | 4/1996 | Okano | |
| 5,572,010 A | | 11/1996 | Petrie | 235/494 |
| 5,604,596 A | * | 2/1997 | Ukai et al. | 358/296 |
| 5,640,253 A | * | 6/1997 | Uchida et al. | 358/501 |
| 5,682,540 A | | 10/1997 | Klotz, Jr. et al. | 395/766 |
| 5,696,365 A | | 12/1997 | Ukai et al. | |
| 5,740,514 A | * | 4/1998 | Natsudaira | 399/366 |
| 5,771,101 A | * | 6/1998 | Bramall | 358/405 |
| 5,822,660 A | * | 10/1998 | Wen | 399/194 |
| 5,862,271 A | | 1/1999 | Petrie | 382/309 |
| 5,901,224 A | * | 5/1999 | Hecht | 713/179 |
| 5,939,703 A | | 8/1999 | Hecht et al. | 235/494 |
| 5,982,956 A | | 11/1999 | Lahmi | 382/306 |
| 5,999,766 A | * | 12/1999 | Hisatomi et al. | 399/80 |
| 6,076,738 A | | 6/2000 | Bloomberg et al. | 235/494 |
| 6,078,698 A | | 6/2000 | Lorton et al. | 382/278 |
| 6,175,714 B1 | | 1/2001 | Crean | 399/366 |
| 6,178,243 B1 | | 1/2001 | Pomerantz et al. | |
| 6,233,684 B1 | | 5/2001 | Stefik et al. | 713/176 |
| 6,298,171 B1 | | 10/2001 | Lorton et al. | 382/278 |
| 6,641,053 B1 | | 11/2003 | Breidenbach et al. | 235/494 |
| 6,782,217 B1 | * | 8/2004 | Ando | 399/79 |

(Continued)

FOREIGN PATENT DOCUMENTS

EP    1 513 075 A2    3/2005

Primary Examiner — Edan Orgad
Assistant Examiner — Kari Schmidt
(74) Attorney, Agent, or Firm — Philip E. Blair; Fleit Gibbons Gutman Bongini & Bianco P.L.

(57) ABSTRACT

A system and method for controlling the reproduction of documents containing sensitive information includes an input for receiving a document; a device for storing a digitized document; a detector for identifying encoded sensitive information; a decoder operatively connected to the detector, which extracts digitally encoded information from the sensitive information; a processor operatively connected to the decoder, which receives digitally decoded sensitive information; a user interface module for receiving a user identity and an access mediator for receiving decoded sensitive information from the processor, comparing the user identity with a decoding scheme associated with the document and allowing or disallowing the decoded sensitive information to be reproduced.

25 Claims, 7 Drawing Sheets

U.S. PATENT DOCUMENTS

| | | |
|---|---|---|
| 6,820,807 B1 | 11/2004 | Antognini et al. |
| 6,999,766 B1 * | 2/2006 | Padovani ........................ 455/437 |
| 7,197,644 B2 * | 3/2007 | Brewington .................. 713/176 |
| 7,343,627 B2 * | 3/2008 | Gaebel et al. .................... 726/27 |
| 7,366,908 B2 * | 4/2008 | Tewfik .......................... 713/176 |
| 7,389,420 B2 * | 6/2008 | Tian ............................... 713/176 |
| 7,770,220 B2 * | 8/2010 | Fernstrom ........................ 726/20 |
| 2003/0005303 A1 * | 1/2003 | Auslander et al. ............. 713/176 |
| 2005/0039034 A1 * | 2/2005 | Doyle et al. ................... 713/193 |
| 2005/0041263 A1 * | 2/2005 | Ishikawa et al. .............. 358/1.14 |
| 2006/0184522 A1 * | 8/2006 | McFarland et al. ................ 707/5 |
| 2006/0195906 A1 * | 8/2006 | Jin et al. ........................... 726/26 |
| 2007/0050696 A1 * | 3/2007 | Piersol et al. .................. 715/500 |
| 2007/0283446 A1 * | 12/2007 | Yami et al. ....................... 726/27 |

* cited by examiner

490

Data Structure for Control Passage

Identification Information
    Employee A – Access to 420, 430, 470
    Employee B – Access to 420
    Employee C – Access to all
    Other Employees – Access to none
    ...

Encryption Key

Sensitive Information
    420 - John Doe
    430 - Acme Corporation
    440 - 1234
    450 - 7891
    460 - 9876
    470 - Acme Corporation
    480 - Bank Corporation
    ...

*FIG. 5*

SYSTEM AND METHOD FOR CONTROLLING REPRODUCTION OF DOCUMENTS CONTAINING SENSITIVE INFORMATION

RELATED APPLICATIONS

None.

FIELD OF THE INVENTION

The embodiments disclosed herein relate to documents containing sensitive information, and more particularly to a system and method for controlling reproduction of documents containing sensitive information by incorporating user authorization restrictions.

BACKGROUND

Individuals are often comfortable dealing with documents in hardcopy format. In general, hardcopy documents are easier to read, handle, and store than documents kept in the digital domain. However, control of document reproduction and dissemination is a concern because copies of documents containing sensitive information can be easily transmitted from person to person. As such, there is a risk of documents containing sensitive information being reproduced innocently or illicitly by persons without authorization.

Methods exist to limit the usefulness of unauthorized copying of documents. The emergence of electronic document processing systems has enhanced significantly the functional utility of plain paper and other types of hardcopy documents when the human readable information they normally convey is supplemented by writing appropriate machine readable digital data on them. This machine readable data enables the hardcopy document to actively interact with such a document processing system in a variety of different ways when the document is scanned into the system by an ordinary input scanner. Various methods of embedding machine readable code into documents in order to control the reproduction of documents have been tried, and are described in U.S. Pat. No. 4,728,984 entitled "Data Handling and Archiving System", U.S. Pat. No. 5,982,956 entitled "Secure Method for Duplicating Sensitive Documents", and U.S. Pat. No. 6,175,714 entitled "Document control system and method for digital copiers", all of which are incorporated by reference in their entireties for the teachings therein.

Prior attempts to control reproduction offer access that is all or nothing. Once access is granted, it cannot be controlled in any other way. This makes it difficult to control who should have access to the information contained within the document. Prior attempts are limited in that typically an entire document contains machine readable code, and once access is granted, the entire document is decoded. Thus, there is a need in the art for a document to contain both human readable passages, and machine readable passages that encode sensitive information, where the decoding of the sensitive information is controlled by user authorization restrictions associated with the document.

SUMMARY OF THE INVENTION

A system and method for controlling reproduction and dissemination of documents containing sensitive information, wherein the document for reproduction contains encoded sensitive information and encoded user authorization restrictions. The user authorization restrictions control the reproduction of the encoded sensitive information, such that a particular user may have access to none, some, or all of the encoded sensitive information which is reproduced in appropriate form based on the user's level of authorization. Even if a document is widely disseminated, the user authorization restrictions associated with the document would only allow those individuals with access to the sensitive information to view it.

A system for reproducing a document with encoded sensitive information comprises a device for storing a digitized document; a detector for identifying encoded sensitive information; a decoder operatively connected to the detector, where the decoder extracts digitally encoded information from the sensitive information; a processor operatively connected to the decoder, where the processor receives digitally decoded sensitive information; a user interface module for receiving a user identity and an access mediator for receiving decoded sensitive information from the processor, for comparing the user identity with a decoding scheme associated with the document and allowing or disallowing the decoded sensitive information to be reproduced.

A system for reproducing a document comprises an input for receiving a document, the document comprising one or more human readable passages and one or more machine readable passages, the one or more machine readable passages encoding sensitive information or a decoding scheme for the sensitive information; a device for storing the digitized document as an electronic image; a code detector for identifying the one or more machine readable passages; a decoder in operative communication with the code detector, where the decoder extracts digitally encoded information from the one or more machine readable passages; a processor in operative communication with the decoder, where the processor receives extracted sensitive information; a user interface module for receiving a user identity; and an access mediator for receiving the extracted decoding scheme, receiving the extracted sensitive information from the processor, comparing the user identity with the extracted decoding scheme to determine whether the user should be given access to the extracted sensitive information, and permitting the reproduction of the sensitive information if allowed.

A method for decoding a document with machine readable passages comprises detecting machine readable passages in a digitized document; decoding the machine readable passages in the digitized document; determining a decoding scheme associated with the document; obtaining a user identity; comparing the decoding scheme associated with the document with the user identity; and determining which of the machine readable passages to decode.

A method of creating a document comprises storing a digitized document; selecting information in a digitized document to encode; encoding the information into machine readable passages; defining a decoding scheme for the information; encoding the decoding scheme into machine readable passages; and creating a document where human readable passages are replaced with machine readable passages.

BRIEF DESCRIPTION OF THE DRAWINGS

The present invention will be further explained with reference to the attached drawings, wherein like structures are referred to by like numerals throughout the several views. The drawings are not necessarily to scale, the emphasis having instead been generally placed upon illustrating the principles of the present invention.

FIG. 5 is an exemplary illustration of a control passage which defines a decoding scheme for a document.

While the above-identified drawings set forth preferred embodiments of the present invention, other embodiments of the present invention are also contemplated, as noted in the discussion. This disclosure presents illustrative embodiments of the present invention by way of representation and not limitation. Numerous other modifications and embodiments can be devised by those skilled in the art which fall within the scope and spirit of the principles of the present invention.

DETAILED DESCRIPTION

A system and method for reproducing documents containing sensitive information is disclosed. In the method, a document is analyzed, portions of information are selected as "sensitive" and subsequently redacted, the redacted information is encoded (i.e., obscured) and optionally encrypted and then the redacted information is replaced with machine readable code. A decoding scheme is also included on the document as machine readable code. The decoding scheme, among other things, defines user access rights. The system includes a user interface module that collects information regarding the identity for a particular user, compares this information with the decoding scheme of the document and determines whether to decode none, some, or all of the redacted information contained within the document. The document is then made available to the user with the decoded redacted information replaced with the human readable passages. Different users will have different access rights for the document and the decoding of redacted information may be made available on an individual basis subject to the user's level of authorization. In the system and method, the redacted document, which all users have access to, preserves the encoded sensitive information in machine readable form.

Figure 1:
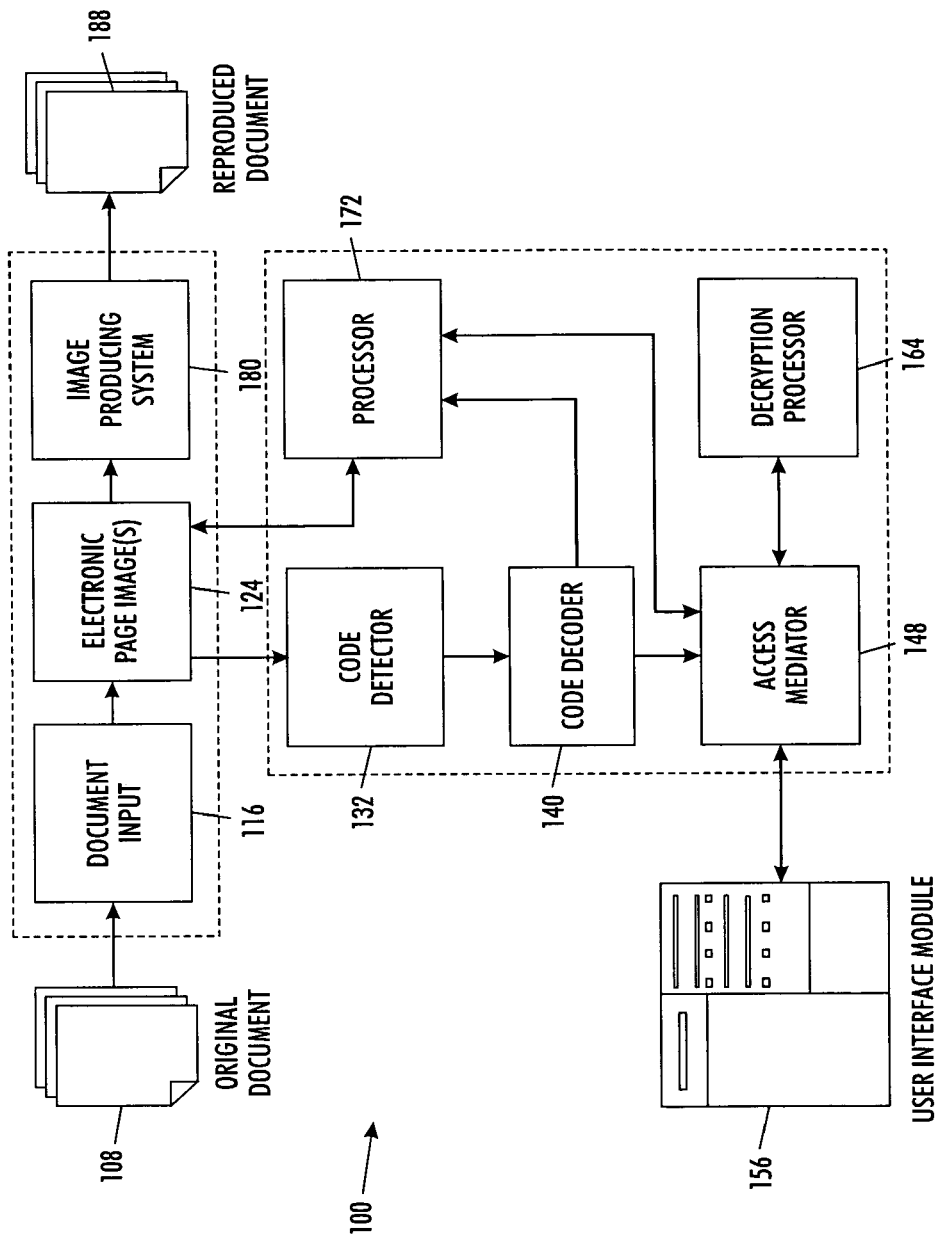
FIG. 1 is a schematic diagram showing the main components of a document reproducing system.

With reference to FIG. 1, a document reproducing system 100 includes a number of components which will be described in detail. First, the document reproducing system 100 includes a document input device 116 that receives and digitizes an original document 108 into internally stored electronic page image(s) 124. The original document may be a hardcopy, an electronic document file, one or a plurality of electronic images, electronic data from a printing operation, a file attached to an electronic communication or data from other forms of electronic communication. The document input device 116 may include one or more of the following well-known devices: a copier, a xerographic system, a digital image scanner (e.g., a flat bed scanner or a facsimile device), a disk reader having a digital representation of a document on removable media (CD, floppy disk, rigid disk, tape, or other storage medium) therein, or a hard disk or other digital storage media having one or more document images recorded thereon. Those skilled in the art will recognize that the document reproducing system 100 would work with any device suitable for printing or storing a digitized representation of a document.

The electronic page image(s) 124 are processed by a code detector 132 that identifies and extracts machine readable code in the electronic page image(s) 124. A code decoder 140 extracts digitally encoded information from the machine readable code. The electronic page image(s) 124 may include one or more passages of machine readable code encoding information that is sensitive (also referred to as a redaction passage) and which access to is controlled through redaction in the original document 108; as well as one or more passages of machine readable code that define the decoding scheme (also referred to as a control passage). The sensitive information may include, but is not limited to, text, data, and images. Those skilled in the art will recognize that any information within a document that can be encoded into machine readable code can be selected as sensitive. The decoding scheme may include, but is not limited to, a suite of protocols, key ciphers, and user-prescribed actions. For example, the decoding scheme may define which employees of a company should be given access to the sensitive information, what the sensitive information is, or at what time or date the sensitive information may be viewed. The decoding scheme may also contain decoding rules, and optionally, decryption rules for the sensitive information.

An access mediator 148 collects the extracted decoding scheme from the code decoder 140. A processor 172 collects the decoded sensitive information from the code decoder 140. The processor 172 also receives the location of each redaction passage within the electronic page image(s) 124 defined as the region within the electronic page image(s) 124 that is to be replaced with the decoded sensitive information. The processor 172 provides the access mediator 148 with the decoded sensitive information within the redaction passage currently being selected for decoding. Based on the information passed by the processor 172 and the extracted decoding scheme, the access mediator 148 determines whether to either allow or not allow access to the sensitive information. The access mediator 148 will base this determination in part on the user interface module 156 provided from outside of the document producing system 100. The user interface module 156 may include any feature that will allow the user to identify and authenticate himself including, but not limited to name, password, X 509 certificate, access card, decryption key, biometric technology or other identifiers. The user interface module 156 may comprise any authenticator or user identity system known to those skilled in the security arts. Based on the information received from the user interface module 156, the decoded sensitive information, and the extracted decoding scheme, a determination is made by the access mediator 148 to either allow or not allow access to the particular sensitive information corresponding only to the particular redaction passage (i.e., on a redaction passage-by-redaction package basis). If access is allowed, any sensitive information that may have been encrypted will be decrypted by a decryption processor 164, returned to the access mediator 148, and then returned by the access mediator 148 to the processor 172. The decrypted content that is to replace the redaction passages within the defined region is then rastered by the processor 172 into the electronic page image(s) 124 in place of the corresponding redaction passage.

After the appropriate redaction passages have been processed, and a determination is made as to whether to allow or disallow the sensitive information to be displayed in each case, an image producing system 180 reproduces a new document 188 from the contents of the electronic page image(s) 124.

Figure 2:
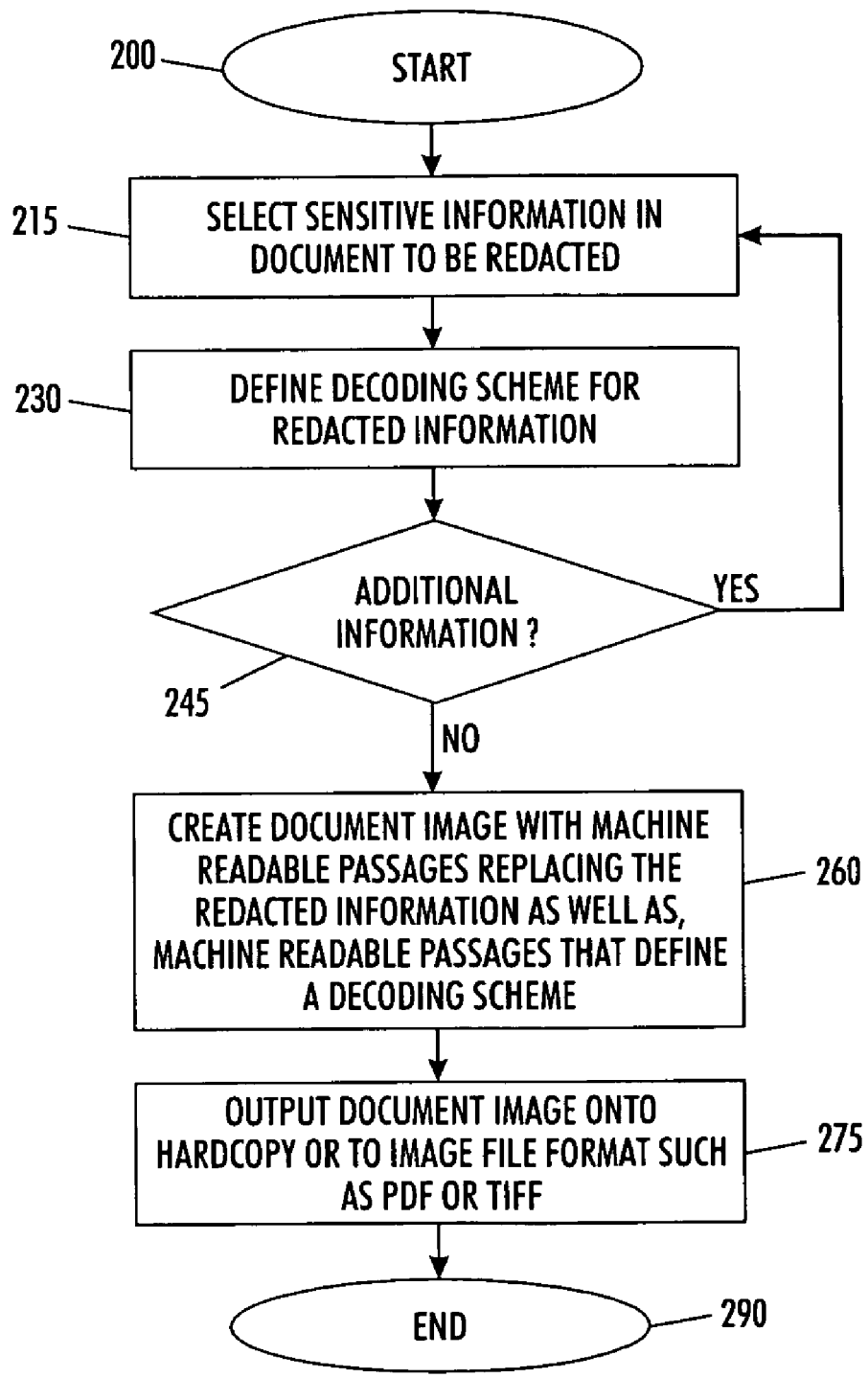
FIG. 2 is a flow diagram for the method of creating a document.

FIG. 2 is a flow diagram illustrating the steps of a method for creating a document with sensitive information that has been encoded using machine readable code. In step 200, a user inputs a document into an electronic document processing system for digitization. Typically, the electronic document processing system generally includes an input scanner for electronically capturing the general appearance (i.e., the human readable information content and the basic graphical layout) of human readable hardcopy documents; programmed computers for enabling a user to create, edit and otherwise manipulate electronic documents; and printers for producing hardcopy renderings of electronic documents.

In step 215, an individual (for example, a manager of a company) chooses which information in the document is considered sensitive. The individual may want to hide or redact the sensitive information from certain users of the document. The decision to redact may be based on a company wanting to keep certain information confidential to users having access to the document. Other reasons may include, but are not limited to, information in which a company may not wish to divulge until a later date or time. Those skilled in the art will recognize that information within a document may be selected for redaction based on a user's needs and be within the scope and spirit of the present invention.

In step 230, the individual defines the rules of the decoding scheme for the sensitive information. For example, a rule may define access rights by coupling user names to authorization levels for access to sensitive information passages.

As shown in step 245, steps 215 and 230 are repeated until all of the information to be redacted has been identified. Each of the sensitive information passages may have different access rights. For example, the decoding scheme may allow some of the sensitive information passages to be accessed by a particular user while other sensitive information passages may not be accessed by that same user.

Once the information to be redacted has been identified, each of the selected sensitive information is replaced with passages of machine readable code (redaction passage) and the original human readable information is removed, as shown in step 260. As an added measure or level of security, the sensitive information may be encrypted and then encoded. One or more control passages are appended to the document in the form of machine readable code merged into the document image without obscuring the human readable content of the document, and define the decoding scheme for each of the redaction passages. In an embodiment, the machine readable code is configured as glyphs. The coding and decoding of glyphs is known in the art and is described in commonly assigned U.S. Pat. No. 5,444,779, the entirety of which is hereby incorporated by reference. Those skilled in the art will realize that other types of machine readable codes may be embedded in the document including, but not limited to, microdots, multi-dimensional bar codes and similar machine readable codes without departing from the spirit and scope of the present invention.

In step 275 the completed document may be a hardcopy output document that is printed or an electronic document for viewing or reproduction that can be saved as an image file format such as a PDF, TIFF, or similar file formats. The document may be a hardcopy, an electronic document file, one or a plurality of electronic images, electronic data for a printing operation, a file attached to an electronic communication or data for other forms of electronic communication. The method terminates at step 290.

Figure 3:
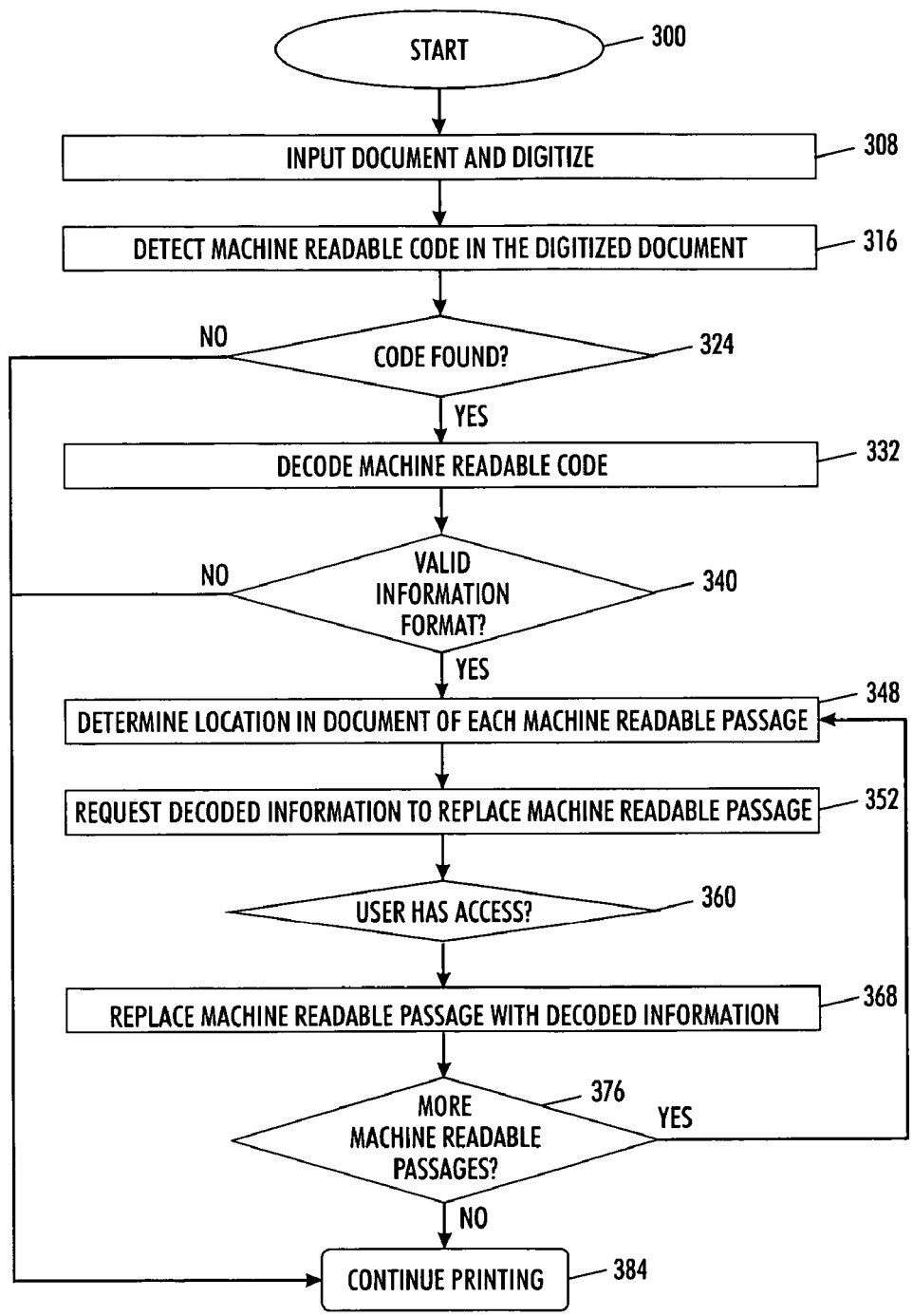
FIG. 3 is a flow diagram for the method of reproducing a document using the document reproducing system.

FIG. 3 is a flow diagram illustrating the steps of a method for the reproduction of a document containing sensitive information. In step 300, a user obtains a copy of a document containing sensitive information that has been redacted in whole or part and replaced with machine readable code. The user may want to gain access to the sensitive information contained within the document and subsequently print or view a new document revealing the decoded sensitive information. Typically, the user will electronically capture the document using a document input device 116 including, but not limited to, a digital copier, a xerographic system, a digital image scanner, a disk reader having a digital representation of a document on removable media therein, or a hard disk or other digital storage media having one or more document images recorded thereon, and convert the inputted document into a digital document, as shown in step 308.

Once the document has been represented in a digitized form, the code detector 132 is employed to determine if the digitized document contains machine readable code, as shown in step 316 which detects machine readable code in the digitized document.

The code detector 132 determines whether or not the document contains machine readable code in step 324. If the code detector 132 does not locate any machine readable code in the document, the method proceeds to step 384 and the document is printed or viewed as is. If the code detector 132 locates machine readable code in the document, the method proceeds to step 332 and a code decoder 140 extracts the digitally encoded information in the machine readable code. Once machine readable code in the document is decoded, the code decoder 140 then determines whether the machine readable code constitutes a valid format, as shown in step 340. If the machine readable code is in an invalid format the method proceeds to step 384 and the document is copied as is. If the machine readable code is in a valid format, the method continues to step 348 which determines the location in the document of each machine readable passage. The code detector 132 also determines whether machine readable code is a control passage or a redaction passage. The code detector 132 can operate on a page-by-page basis or on a document basis where a multiple page document may be controlled by one page.

The decoded information from the machine readable code is sent to either the access mediator 148 or to the processor 172. The access mediator 148 receives the extracted decoding scheme from the control passages. The processor 172 receives the decoded sensitive information as well as the location of each redaction passage within the electronic page image(s) 124 that is to be replaced with the decoded sensitive information. The processor 172 provides the access mediator 148 with the decoded sensitive information contained within the redaction passage currently being processed, as shown in step 352. The user interface module 156 receives the identity of a user attempting to gain access to the document. Once the user identity has been established, the user interface module 156 then provides the access mediator 148 with this information. The access mediator 148 compares the user identity with the extracted decoding scheme and determines whether the user has access to the sensitive information, as shown in step 360. If the sensitive information is encrypted, the encrypted content of the sensitive information will be decrypted by the decryption processor 164 and will be returned by the access mediator 148 to the processor 172. The decrypted content that is to replace the sensitive information within the defined redaction passage region is then merged by the processor 172 into the electronic page image(s) 124, as shown in step 368.

After the sensitive information that the user is allowed access to has been decoded, as described in step 376, the image producing system 180 completes the reproduction of the document 188 from the contents of the electronic page image(s) 124 and the document is reproduced, as shown in step 384.

Figure 4:
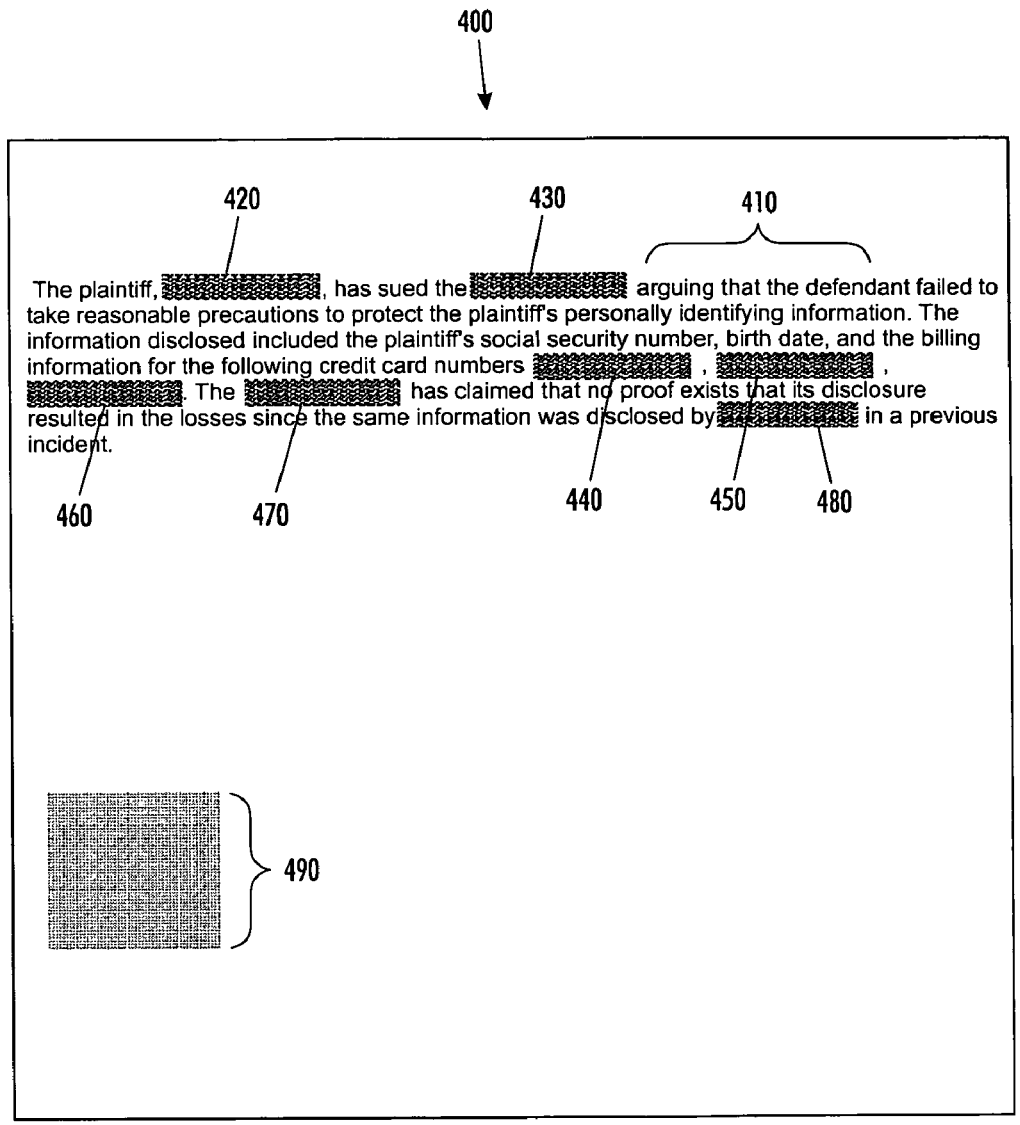
FIG. 4 is an exemplary illustration of a document created using the method.

As shown in FIG. 4, an example of a document 400 has been created using the disclosed method. The document contains human readable text passages, an example of which is shown at 410, machine readable code 420, 430, 440, 450, 460, 470 and 480 encoding sensitive information, and control passage 490 having machine readable code encoding a decoding scheme. The machine readable code is configured as glyph blocks.

The control passage 490, encodes the decoding scheme for the sensitive information that is encoded within the machine readable code 420, 430, 440, 450, 460, 470 and 480. The decoding scheme may include, but is not limited to, a suite of protocols, ciphers, key management, and user-prescribed actions. For example, the decoding scheme may define which employees of a company should be given access to the sensitive information, what the sensitive information is, or at what time or date the sensitive information can be viewed. The decoding scheme may also contain decoding rules, and optionally, decryption rules for the sensitive information.

The control passage 490 can be created at any location within the document 400. As shown in FIG. 4, the control passage 490 is located at the bottom left corner of the document 400. At this location, the control passage 490 is unobtrusive and is visually pleasing. Those skilled in the art will recognize that the control passage 490 could be placed anywhere in the document 400 and be within the scope and spirit of the present invention.

The control passage 490 can be in any shape and size on the document 400. As shown in FIG. 4, the control passage 490 is in the shape of glyphs. Glyph shape codes have the advantage that they can be designed to have a relatively uniform appearance. Those skilled in the art will recognize that the control passage 490 can be any shape or size and be within the scope and spirit of the invention.

FIG. 5 illustrates a decoded view of the control passage 490 of FIG. 4. The control passage 490 contains a data structure that defines information and data. In the example shown in FIG. 5, the control passage 490 includes a decoding scheme that defines: identification information, which defines which users should be allowed access to certain sensitive information in the machine readable code passages of the document; an encryption key, which defines the secret piece of information that defines how the sensitive information was encrypted; and what the sensitive information is. For instance, in the decoding scheme found in control passage 490, Employee A is allowed access to machine readable code passages 420, 430, 470 and 480. Therefore, a reproduced document would substitute machine readable code passage 420 with human readable passage "John Doe", machine readable code passage 430 with human readable passage "Acme Corporation", machine readable code passage 470 with human readable passage "Acme Corporation" and machine readable code passage 480 with human readable passage "Bank Corporation".

Figure 6:
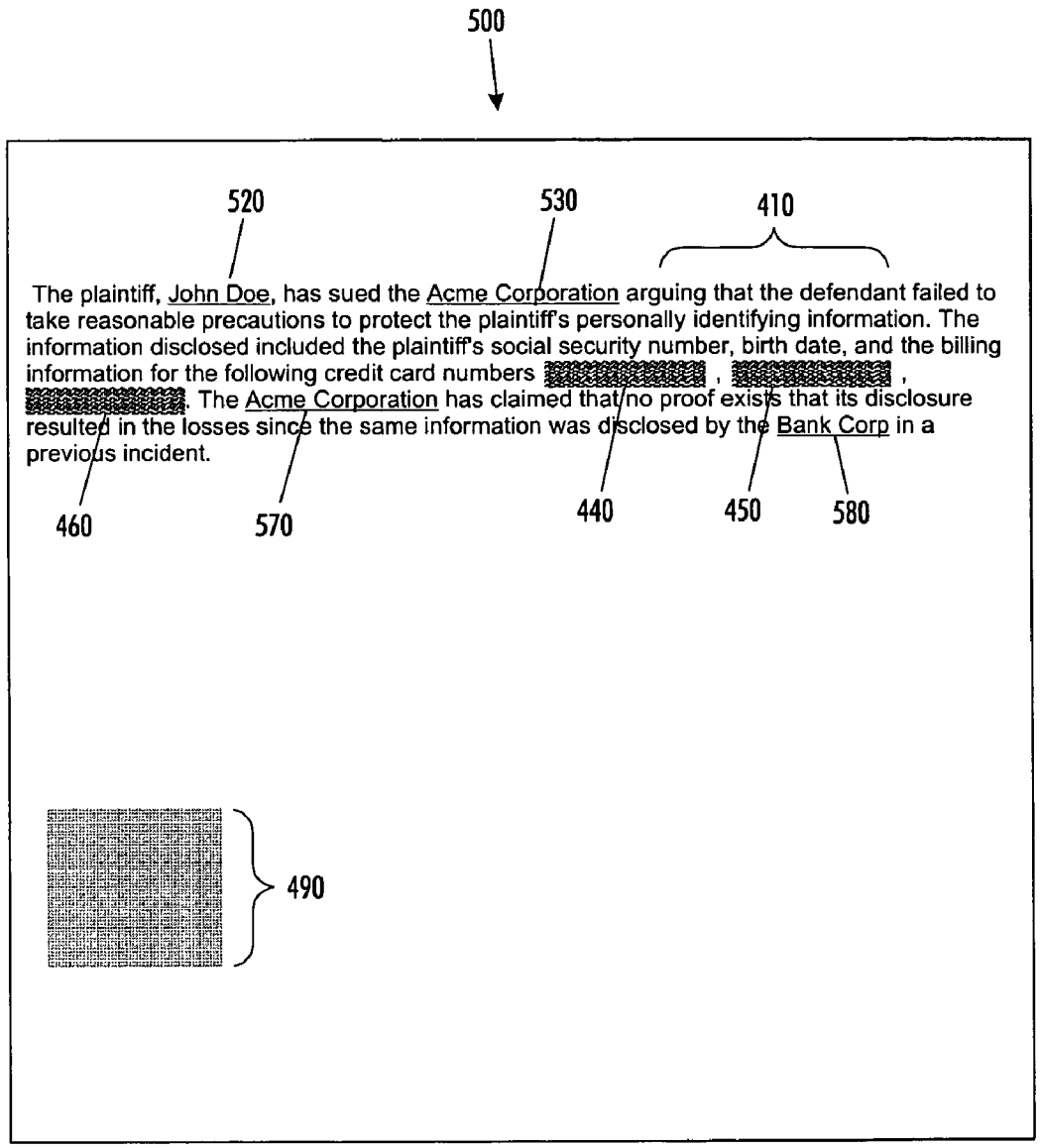
FIG. 6 is an exemplary illustration of a reproduced document using the document reproducing system and method.

FIG. 6 shows an example of a document 500 that has been reproduced using the decoding scheme defined in FIG. 5 by a user, Employee A. As shown in FIG. 5, machine readable code passages 420, 430, 470 and 480 from document 400 (shown in FIG. 4) have been decoded. The user, Employee A, does not have the authorization to view the sensitive information within the redaction passages 440, 450 and 460, and the redaction passages 440, 450 and 460 were not decoded and remain redacted. As shown in FIG. 6, the reproduced document 500 has the human readable passage 410, machine readable passages 440, 450 and 460, decoded sensitive information 520, 530, 570 and 580, and the control passage 490.

Figure 7:
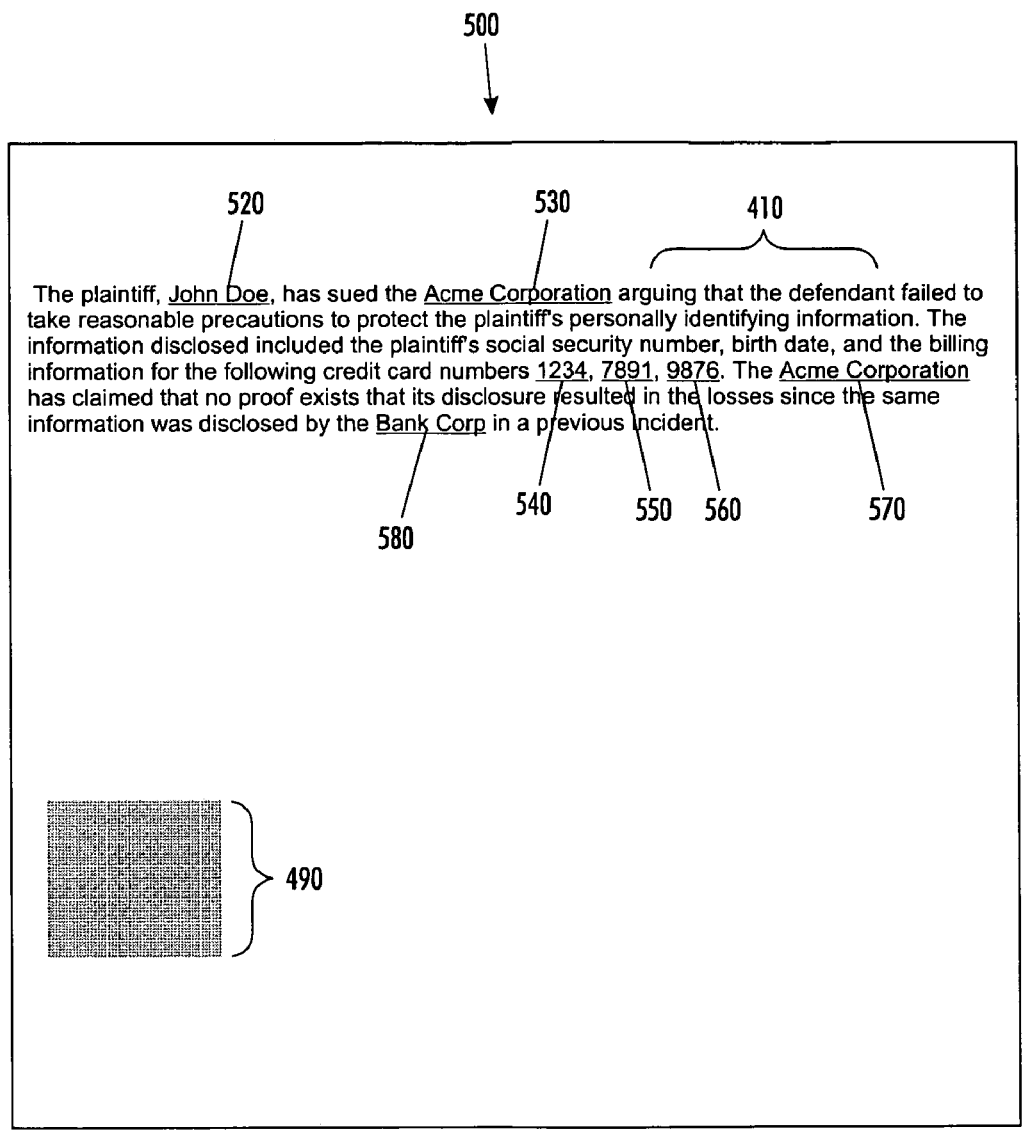
FIG. 7 is an exemplary illustration of a reproduced document using the document reproducing system and method.

FIG. 7 shows another example of a document 500 that has been reproduced using the decoding scheme defined in FIG. 5 by a user, Employee C. As shown in FIG. 7, machine readable code passages 420, 430, 440, 450, 460, 470 and 480 from document 400 (shown in FIG. 4) have been decoded. The user, Employee C, is allowed to view the sensitive information within all of the redaction passages in the document, and therefore all of the redaction passages were decoded and reproduced as human readable passages. As shown in FIG. 7, the reproduced document 500 has human readable passage 410, decoded sensitive information passages 520, 530, 540, 550, 560, 570 and 580, and the control passage 490.

In an embodiment, the sensitive information appears as a blank area in the document, is blacked over, or is otherwise obscured so the sensitive information is not readable. The sensitive information is encoded in one or more machine readable code passages appended to the end of the document as a separate page(s). The encoded sensitive information may also be placed in the margins or other whitespace of the document.

The machine readable code passages may contain the sensitive information that the user is interested in. The machine readable code passages may act as a key or a pointer to information located elsewhere in the document. The machine readable code passages may point or connect to information external to the document including, but not limited, to another document, electronic data, or a web page address.

A method for creating a document includes digitizing a document; storing the digitized document; selecting information in the digitized document that a user wishes to encode; encoding the information into machine readable passages; defining a decoding scheme for the information; encoding the decoding scheme into machine readable passages; and creating the document.

A method for decoding a document with machine readable passages includes inputting and digitizing a document; detecting machine readable passages in the digitized document; decoding the machine readable passages in the digitized document; determining a decoding scheme associated with the document; obtaining a user identity from a user; comparing the decoding scheme associated with the document with the user identity; and determining which of the machine readable passages to decode.

The document reproducing system can be used for controlling access to sensitive information in a document for multiple users. The document reproducing system can control distribution of a document to the entire staff of a company. For example, a document containing sensitive information regarding the salaries of employees at the company would function with the document reproducing system. The document contains human readable text passages, for example the names of the employees, machine readable code, for example the social security numbers and salaries of the employees, and a control passage defining the decoding scheme associated with the document.

The head of the company will identify herself by entering her password in a user interface module, for example, a keyboard, that is in communication with the document reproducing system. The head of the company has a password that allows access to all of the encoded sensitive information within the document. Therefore, the access mediator in communication with the document reproducing system allows all of the machine readable code within the document to be replaced with the decoded sensitive information. The document reproduced will display the names, social security numbers and salaries of all of the employees in the company.

An executive at the same company will identify herself by entering her password in the user interface module associated with the same or another document reproducing system in the company. The executive has a password that will give her access to all of the encoded sensitive information for all the employees that the executive is responsible for at the company. Therefore, the only machine readable passages that will be decoded will be those associated with all employees that the executive is responsible for. The document reproduced will display the names, social security numbers and salaries only for the employees that the executive is responsible for in the company, and machine readable code for the sensitive information for all other employees of the company.

The first year employee at the same company will identify himself by entering his password in the user interface module associated with the same or another document reproducing system in the company. The first year employee has a password that only provides access to the machine readable code associated with his salary. Therefore, the document reproduced will only display first year employee's salary, and machine readable code for the other encoded sensitive information.

A clerk working at the same company gets a copy of the document and enters his password in the user interface module associated with the same or another document reproducing system in the company. The clerk has a password that gives the clerk access to none of the encoded sensitive information in the document. Therefore, the document reproduced will be an exact duplicate of the original document, with none of the machine readable code decoded.

A third party who gets a copy of the document and attempts to reproduce the document without a password having an authorization level will receive a document that is an exact duplicate of the original document, with none of the machine readable code decoded.

The document reproducing system can be used for controlling distribution of a document containing time and/or date sensitive information. The document reproducing system has application for any number of confidential time sensitive documents, including, but not limited, product releases, corporate governance documents, filings with governmental agencies, and press releases. The document reproducing system allows secure distribution of a document prior to being made public permitting true synchronized disclosure when the information becomes visible when copied after the designated time. Alternatively, a decoding key is distributed after a designated time to the individuals that are allowed access to the sensitive information in the document. For example, a company plans on publicly announcing, through a hardcopy document, their fourth quarter earnings statement on Wednesday at 9:30 a.m. A document containing the date sensitive and time sensitive information, which is encoded as machine readable code, is distributed to the company, as well as the public. A control passage is present on the hardcopy document and contains information on the decoding scheme associated with the encoded sensitive information. The decoding scheme defines the date and time that the sensitive information can be decoded. For example, the date sensitive and time sensitive information cannot be decoded until after Wednesday at 9:30 a.m.

Before the information is to be decoded according to the decoding scheme of the control passage, on Tuesday for example, an employee of the company obtains a hardcopy of the document containing encoded sensitive information. The employee decides that she wants to get the fourth quarter earnings statement before everyone else. The document is taken to a company document reproducing system, and the employee enters her access card into the card holder. The machine readable code on the document is decoded, as well as the decoding scheme. The decoding scheme has rules that state that access to the encoded information is not allowed prior to Wednesday at 9:30 a.m. A document is reproduced on the document reproducing system that contains machine readable code and does not reveal the sensitive information.

When the same employee tries to reproduce the document after Wednesday at 9:30 a.m., the document is reproduced with the sensitive information decoded.

The document reproducing system can be used for providing secure identification documents which would not be readable, alterable or forgeable by the carrier. The document reproducing system has application for many types of documents, including, but not limited to, identification documents, government documents, travel documents, and tickets to events. For example, machine readable passports, visas and border crossing cards are more difficult to counterfeit or alter, allow faster but more thorough inspection of each carrier, and permit instantaneous capture of data from each document. The document reproducing system and methods could be used to create travel documents and identification cards that would provide better security and reduce alterations, forgeries, and other illicit activities by avoiding reproduction or viewing of sensitive information, such as social security numbers, without proper authority and equipment. The authority to view sensitive information within an identification document can be restricted to parties requiring access to the sensitive information while maintaining the suitability of the document for its intended purposes.

Birth, marriage and death documents, which are often treated as public records, would be much more secure if they contained machine readable code. Therefore, the disclosed methods could be used to provide a sense of security to these otherwise public documents.

The document reproducing system can be used as a rights management system for hardcopy documents. Such a rights management system for hardcopy documents would be similar to digital rights management for electronic content. Content protection is of the utmost concern for content owners and distributors, especially with peer-to-peer file sharing and piracy over the internet. Digital rights management technology allows digital content to be distributed securely on CD-ROMS, DVD-ROMS, peer-to-peer networks, enterprise networks and the internet. Digital rights management allows a vendor of content in electronic form to control the material and restrict its usage in various ways that can be specified by the vendor. Typically the content is a copyrighted digital work to which the vendor holds rights. Many digital rights management systems fail to meet the challenge of protecting the rights of the copyright owner while also respecting the rights of the purchaser of a copy. Digital rights management systems have not succeeded in preventing criminal copyright infringement by organized, unlicensed, commercial pirates. Flaws of some digital rights management systems include, but are not limited to, (i) physical protection, they utilize separate hardware to ensure protection (dongles and USB and smart card devices), (ii) product activation, invalidates or severely restricts a product's functionality until the product is registered with a publisher by means of a special identification code, and (iii) watermarking, adds hidden copyright or other verification messages to the content but does not restrict its use, and provides a mechanism to track the content to the original owner.

The document reproducing system and methods disclosed create a hardcopy document that encodes copyright information and a control passage that defines the decoding scheme, for example, who has access to the copyright information. The advantages of using the document reproducing system and methods include, but are not limited to, the copyright information and the decoding scheme are present on the same hardcopy document; access to the copyright information is immediate, after the user identifies himself; and the hardcopy document contains user restrictions.

All patents, patent applications, and published references cited herein are hereby incorporated by reference in their entirety. While this invention has been particularly shown and described with references to preferred embodiments thereof, it will be understood by those skilled in the art that various changes in form and details may be made therein without departing from the scope of the invention encompassed by the appended claims.

What is claimed is:

1. A system for reproducing a document with a plurality of redaction passages of encoded sensitive information comprising:
   a scanner for reading a hardcopy printed document with at least one a control passage printed thereon to create a digitized document, wherein the control passage includes: i) an encryption key defining how encoded sensitive information was encrypted; ii) identification information defining which users have access to each redaction passage; and iii) a location of each redaction passage of encoded sensitive information within the digitized document, wherein the location is defined as a region within the digitized document that is to be replaced with the encoded sensitive information as permitted by a user identity;
   a device, communicatively coupled to the scanner, for storing the digitized document;
   a detector for identifying each redaction passage of encoded sensitive information in the digitized document to create decoded sensitive information;
   a decoder operatively connected to the detector, wherein the decoder extracts encoded information from each redaction passage of encoded sensitive information;
   a processor operatively connected to the decoder, wherein the processor receives digitally decoded sensitive information;
   a user interface module for receiving a user identity;
   an access mediator for receiving decoded sensitive information from the processor, comparing the user identity with a decoding scheme associated with the digitized document and allowing or disallowing the decoded sensitive information to be reproduced on a redaction passage-by-redaction passage basis as permitted by the user identity;
   and an image producing system for producing a new digitized document with the decoded sensitive information to be reproduced in each of redaction passage as permitted by the user identity; and the decoded sensitive information to remain redacted in each redaction passage as permitted by the user identity.

2. The system of claim 1, wherein the image producing system reproduces a hardcopy of the document.

3. The system of claim 1 further comprising:
   a decryption processor in operative communication with the access mediator for decrypting the sensitive information.

4. The system of claim 1 wherein the sensitive information is encoded as machine readable code.

5. The system of claim 1 wherein the decoding scheme is encoded as machine readable code.

6. The system of claim 1 wherein the decoding scheme defines individuals that are allowed access to the sensitive information.

7. The system of claim 1 wherein the sensitive information is confidential information.

8. The system of claim 1 wherein the user identity is validated by an authenticator.

9. A system for reproducing a document with a plurality of redaction passages of encoded sensitive information comprising:
   an input for receiving the document, the document comprising one or more human readable passages and one or more machine readable passages, the one or more machine readable passages encoding sensitive information or a decoding scheme for the sensitive information;
   a device for storing a digitized document as an electronic image;
   a code detector for identifying the one or more machine readable passages;
   a decoder in operative communication with the code detector, wherein the decoder extracts digitally encoded information from the one or more machine readable passages;
   a processor in operative communication with the decoder, wherein the processor receives extracted sensitive information and a location of each redaction passage of encoded sensitive information within the document, wherein the location is defined as a region within the document that is to be replaced with the extracted sensitive information;
   a user interface module for receiving a user identity; and
   an access mediator for receiving the extracted decoding scheme, receiving the extracted sensitive information from the processor, comparing the user identity with the extracted decoding scheme to determine whether the user should be given access to the extracted sensitive information, and permitting a reproduction of the sensitive information on a redaction passage-by-redaction passage basis as permitted by the user identity.

10. The system of claim 9 further comprising:
    an image producing system in operative communication with the access mediator, wherein the image producing system reproduces a hardcopy of the document with
      the decoded sensitive information to be reproduced in each of redaction passage as permitted by the user identity; and
      the decoded sensitive information to remain redacted in each redaction passage as permitted by the user identity.

11. The system of claim 9 further comprising:
    a decryption processor in operative communication with the access mediator for decrypting the sensitive information.

12. The system of claim 9 wherein the one or more machine readable passages are encoded as glyph passages.

13. The system of claim 9 wherein the decoding scheme defines individuals that are allowed access to the sensitive information.

14. The system of claim 9 wherein the sensitive information is confidential information.

15. A computer-implemented method for decoding a document with machine readable passages comprising:
    detecting a plurality of redaction passages formed as machine readable passages in a digitized document;
    decoding the machine readable passages in the digitized document;
    determining a decoding scheme associated with the digitized document;
    obtaining a user identity;

decoding sensitive information from the digitized document by comparing the user identity with a decoding scheme associated with the digitized document and a location of each redaction passage of encoded sensitive information within the digitalized document, wherein the location is defined as a region within the digitized document that is to be replaced with the sensitive information which has been decoded and allowing or disallowing the sensitive information that has been decoded to be reproduced on a redaction passage-by-redaction passage basis as permitted by the user identity.

16. The method of claim 15 wherein the machine readable passages include passages that encode sensitive information and passages that encode a decoding scheme for the sensitive information.

17. The method of claim 15 wherein the decoding scheme associated with the document defines individuals that are allowed access to the sensitive information.

18. The method of claim 15 further comprising inputting and digitizing the document.

19. The method of claim 15 further comprising decrypting the decoded machine readable passages.

20. The method of claim 15 further comprising:
processing the decoded machine readable passages into electronic page images to create a decoded document with
the decoded sensitive information to be reproduced in each of redaction passage as permitted by the user identity; and
the decoded sensitive information to remain redacted in each redaction passage as permitted by the user identity.

21. The method of claim 20 further comprising reproducing the decoded document.

22. The method of claim 15 further comprising replacing the machine readable passages with a corresponding human readable text.

23. A computer-implemented method for creating a document comprising:
storing a digitized document;
selecting information in the digitized document to encode;
encoding the information into a plurality of redaction passages of encoded sensitive information;
defining a decoding scheme for the information on a redaction passage-by-redaction passage basis as permitted by a user identity and a location of each redaction passage of encoded sensitive information within the digitalized document, wherein the location is defined as a region within the digitized document that is to be replaced with the encoded sensitive information that has been decoded, whereby
encoding the decoding scheme into the plurality of redaction passages of encoded sensitive information; and
creating the document.

24. The method of claim 23, wherein the plurality of redaction passages of encoded sensitive information are encoded as glyph passages.

25. The method of claim 23 wherein the decoding scheme defines individuals that are allowed access to the sensitive information.

* * * * *